United States Patent Office 3,317,201
Patented May 2, 1967

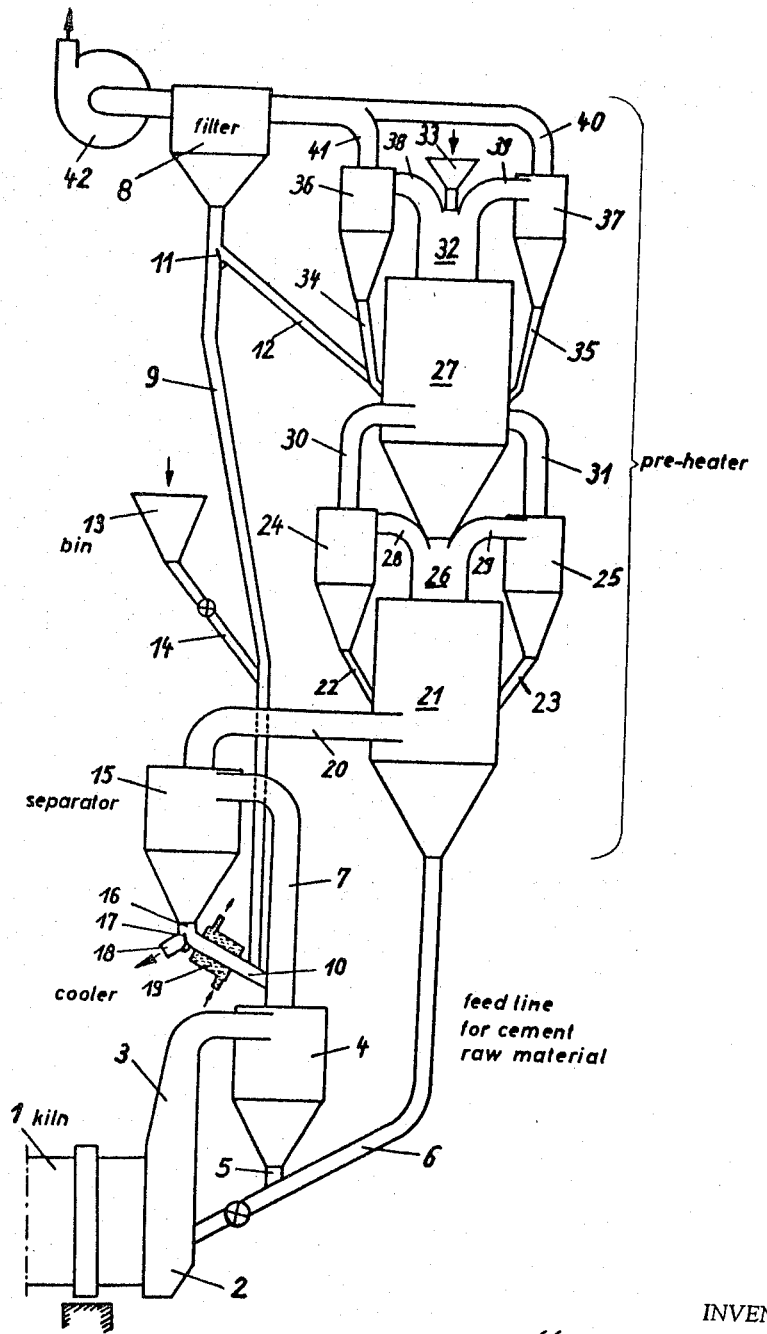

3,317,201
METHOD OF AND ARRANGEMENT FOR INCREASING THE ALKALI CONTENT IN ALKALI-LADEN DUSTS OF FLUE GASES
Heinz-Gert Müller, Neubeckum, and Erich Bade, Beckum, Germany, assignors to Polysius G.m.b.H., Neubeckum, Germany
Filed Apr. 13, 1964, Ser. No. 359,253
6 Claims. (Cl. 263—32)

The present invention relates to a method of and arrangement for increasing the alkali content of dusts separated from flue gases of cement burning installations.

Modern cement burning installations in which the flue gases of the kiln are taken advantage of for pre-heating the cement raw material, frequently have to cope with difficulties caused by the alkali circulation between the kiln and the pre-heater and by alkali deposits in the pre-heater system.

In cement burning installations in which the rotary kiln is preceded by a grate pre-heater, the flue gases are freed from dust between the two heating stages of the pre-heater, and a considerable alkali content has been noticed in the separated dusts. The thus obtained dusts were then refined into a part rich in alkalis and a part poor in alkalis. The part rich in alkalis could then be used, for instance as fertilizer, whereas the part poor in alkalis was returned to the raw material. However, such refining is uneconomical in view of the too-low alkali content of the dusts.

In connection with a cement burning installation which is preceded by a cyclon pre-heater, it is known to introduce into the flue gas flow and dust obtained during the final dust removing operation in an electro-filter. More specifically, this was done ahead of a special separator interposed in the flue gas conduit between the rotary kiln and the pre-heater. The alkalis settle on this cold, fine-grained dust and are then separated from the flue gases in the separator. However, also with an arrangement of this type, the alkali content of the obtained dusts is rather low because the dust carried away from the rotary kiln represent such a high component part of the total quantity of dust, that a further processing of the dust does not pay.

Therefore, it has beeen suggested to separate the dusts which the flue gases from the rotary kiln contain, and to return these separated dusts to the kiln while the alkalis in the flue gases are still in gaseous condition. The alkalis are then precipitated upon the dusts brought from the outside into the flue gas flow and are separated together with said dusts. While the thus obtained dusts have a higher alkali content, still considerable technical means are required for further processing the thus obtained dusts.

It is, therefore, an object of the present invention to provide a method of and arrangement for increasing the alkali content in the dusts separated from flue gases of cement burning installations, which will overcome the above-mentioned drawbacks.

It is another object of this invention to provide a method of and arrangement for increasing the alkali content in dusts separated from flue gases of cement burning installations to such an extent that their direct employment as fertilizers will be possible, or that a further refining of the separated dusts for other fields of employment will be economical.

These and other objects and advantages of the invention will appear more clearly from the following specification in connection with the accompanying drawing diagrammatically illustrating a cement burning installation with a turbulence compartment pre-heater.

The method according to the present invention is characterized primarily in that the alkali-containing dusts which have been separated from the flue gases by a separator are again introduced into the flue gas flow before the latter enters said separator. Thus, the said alkali-containing dusts carry out a multiple circulation while, each time, a quantiy of separated alkali-containing dusts in conformity with the quantity of dust taken by the flue gases from the kiln, will be taken out of said circulation and removed from the system for further processing. If, for instance, from the outside additional dust obtained in an electro-filter is introduced into the flue gas flow, it is, of course, necessary to remove from the circulation a quantiy of alkali-containing dusts which is increased by the said additional quantity of dust, in order to establish equilibrium. It is particularly advantageous from the outside to introduce a fraction of dust the particles of which have at least approximately uniform size.

A particularly good result has been obtained with the method according to the present invention, when the dusts taken from the kiln by the flue gases are separated while the alkalis in the flue gases are still in gaseous condition. Subsequently, the alkalis are in a manner known per se precipitated upon dusts brough in from the outside into the flue gas flow, for instance from the final dust-removing process. These dusts are then, in conformity with the present invention circulated a plurality of times. The method according to the present invention makes it possible to obtain an alkali content which is limited only by the ability of the flue gas flow to carry solid material with regard to the dust quantity, and is further limited by the granular size. Expressed differently, the alkali content is dependent on the number of circulations of the dusts inasmuch as with each circulation, the dust grains are covered with a further alkali layer.

It is thus possible, according to the present invention, to adjust the ratio of the quantity of dust to be returned to the quantity of dust to be removed from the system. This adaptation or adjustment may be effected by means of an adjusting device arranged behind the discharge of the separator. In this way, at the same time, the number of circulations of the dusts is determined. Depending on the adjustment of the said adjusting device, on an average, each dust grain will, in conformity with the law of probability, carry out a certain number of circulations. The alkali rich dust fraction to be withdrawn from circulation may, in conformity with the present invention, also be sorted or graded according to the granular size, and this sorting or grading may be carried out in an air separator having a high separating ability.

An evaporation of the alkalis when the dusts charged with alkalis are again introduced into the flue gas flow will be safely avoided, in conformity with the present invention, by cooling the dusts to be returned prior to their re-entering the flue gas flow. The short stay of the dusts in the gas flow will then prevent a warming-up of the dusts to the evaporation point of the alkalis.

Referring now to the drawing in detail, the dust containing flue gases passing from the rotary kiln 1 through the head 2 into the flue gas conduit 3 are in a cyclon 4 freed from furnace dust which, by means of the discharge 5 and the feeding line 6 for the raw material, is directly returned to the kiln 1 while the still gaseous alkali together with the flue gases pass into the flue gas conduit 7. Dust separated in the electro-filter 8 is then, through conduits 9 and 10 introduced into the said flue gas conduit 7. A gate 11 and a branch conduit 12 permit the entire or partial return of the electro-filter dust into the pre-heater. However, if desired, for instance cement raw powder or cement raw meal may from the bin 13 be conveyed into the flue gas conduit 7 through a conduit 14 leading into conduit 9.

The flue gas conduit 7 leads into a cyclon 15 in which the introduced dusts are separated upon which the alkalis have been precipitated.

Below the discharge 16 there is provided a distributing gate 17 by means of which the quantity of dust to be returned, may be adjusted. The dusts high in alkali content are discharged through a pipe connection 18 for further use or employment. Conduit 10 is surrounded by a cooling water jacket 19 for cooling the dusts to be returned.

The flue gases freed from alkalis now pass through a flue gas conduit 20 into a turbulence chamber 21 of the pre-heater and catch the material introduced from the discharging pipes 22 and 23 of the cyclons 24 and 25 which will then be heated and deposited thereby along the wall of the turbulence chamber 21 so that it is eventually passed through the feeding line 6 into the rotary kiln 1. The flue gases, on the other hand, flow into a pipe 26 into which the material is charged from the turbulence chamber 27. The free gases loaded with the material pass through conduits 28 and 29 into the cyclons 24 and 25 in which the material is again separated while the flue gases pass through gas conduits 30 and 31 into the turbulence chamber 27 having connected thereto the pipe 32 with the funnel 33 for receiving the material to be burned. The pipe 32 furthermore communicates through gas conduits 38 and 39 with cyclons 36 and 37 respectively. Flue gas conduits 40 and 41 lead from the cyclons 36 and 37 respectively to the electro-filter 8 behind which there is arranged a blower 42.

It is, of course, to be understood, that the present invention is, by no means, limited to the particular arrangement shown in the drawing and method described herein, but also comprises any modifications within the scope of the appended claims. Thus, the present invention is also applicable to cement burning installations with cyclon pre-heaters or grate pre-heaters and may also be used in connection with sinter band installations. Furthermore, other chemical substances which, during the burning or sintering process show a behavior similar to alkalis or alkali compounds, may be obtained in concentrated form in conformity with the present invention.

What we claim is:

1. A method of extracting alkali from dust laden flue gases drawn from a cement burning kiln; said alkali being present in said gases in the form of a vapor, said method comprising; conveying the flue gases and the dust therein and the alkali vapor therein from the kiln to a first separating station and therein separating the dust from the flue gases while leaving the alkali vapor in the flue gases, returning the separated dust to the kiln, conveying the flue gases and alkali vapor therein to a second separating station, introducing other dust into said flue gases immediately upon the gases leaving said first separating station and which other dust is at a temperature such that alkali vapor will condense thereon, separating the flue gases from the said other dust and the alkali condensed thereon in said second separating station, discharging the flue gases from said second separating station, discharging said separated other dust with alkali condensed thereon from said second separating station independently from said flue gases, returning at least a portion of said separated other dust to the alkali vapor laden flue gases leaving said first separating station for condensation of further alkali thereon, and cooling said portion of the separated other dust prior to the said return thereof to said alkali vapor laden flue gases.

2. A method according to claim 1 which includes subjecting said flue gases discharged from said second separating station to a further separating operation to separate fine dust therefrom, utilizing said fine dust as the said other dust, and discharging a portion of said alkali laden dust from said second separating station independently from the said portion returned to said flue gases.

3. In combination with a cement burning kiln: a first dust separator having an inlet port and an outlet port and also having a separated dust discharge port, first conduit means leading from said kiln to said inlet port of said separator for conveying from said kiln to said separator a continuous flow of flue gases carrying dust and alkali vapors, second conduit means leading from said dust discharge port of said first separator to said kiln to return the separated out dust thereto, a second separator having an inlet port, an outlet port, and a separated dust discharge port, third conduit means connecting the outlet port of said first dust separator with the inlet port of the second separator, fourth conduit means leading from the dust discharge port of said second separator to said third conduit near the said outlet port of said first separator for supplying dust to the alkali vapor laden flue gases leaving said first separator, a cooler associated with said fourth conduit means to cool dust passing therethrough to a temperature at which alkali vapors will condense thereon, port means for introducing dust into said fourth conduit means, and means for withdrawing alkali laden dust from said dust discharge port of said second separator.

4. In combination according to claim 3 in which control means is provided for adjusting the rate at which alkali laden dust is withdrawn from the dust discharge port of said second separator with respect to the rate at which alkali laden dust passes from said dust discharge port of said second seaprator via said fourth conduit means into said third conduit means.

5. An arrangement according to claim 4 which includes feeding means leading into said kiln for feeding cement raw material thereto, pre-heater means associated with said feeding means for pre-heating cement raw material passing through said feeding means, and fifth conduit means connected to said outlet port of said second separator and communicating with said pre-heater means for passing flue gases from which alkali has been extracted in said second separator from the latter to said pre-heater means.

6. An arrangement according to claim 5 which includes filter means for filtering very fine dust, sixth conduit means leading from said pre-heater means to said filter means for conveying the flue gases from said pre-heater means to said filter means, and additional conduit means leading from said filter means to said port means of said fourth conduit means for conveying thereto fine dust filtered out from said flue gases in said filter means.

References Cited by the Examiner

UNITED STATES PATENTS

| | | | |
|---|---|---|---|
| 2,290,068 | 7/1942 | Peterson | 34—10 X |
| 2,733,909 | 2/1956 | Engelhart | 263—32 |
| 3,146,998 | 9/1964 | Golucke et al. | 263—21 |
| 3,212,764 | 10/1965 | Muller et al. | 263—32 |

FOREIGN PATENTS 755,032  8/1956  Great Britain.

FREDERICK L. MATTESON, JR., *Primary Examiner.*

D. A. TAMBURRO, *Assistant Examiner.*